G. D. MUNSING.
CAN OPENER.
APPLICATION FILED FEB. 1, 1919. RENEWED MAY 18, 1921.

1,397,537.

Patented Nov. 22, 1921.
2 SHEETS—SHEET 1.

Inventor
George D. Munsing
By Frederick V. Winters
Attorney.

G. D. MUNSING.
CAN OPENER.
APPLICATION FILED FEB. 1, 1919. RENEWED MAY 18, 1921.
1,397,537.
Patented Nov. 22, 1921.
2 SHEETS—SHEET 2.
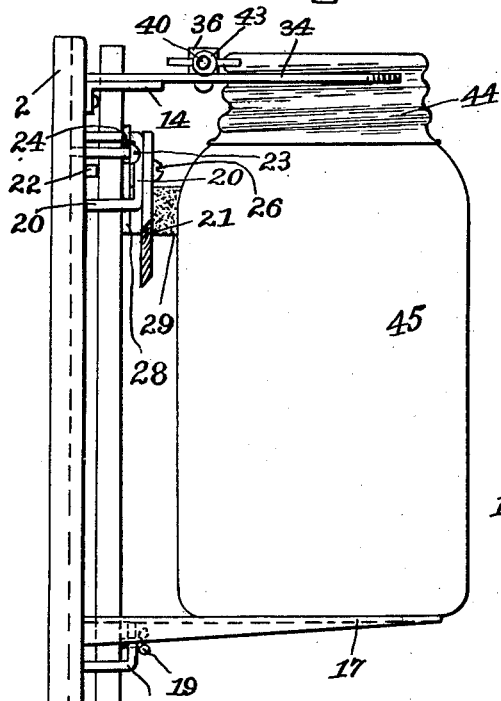
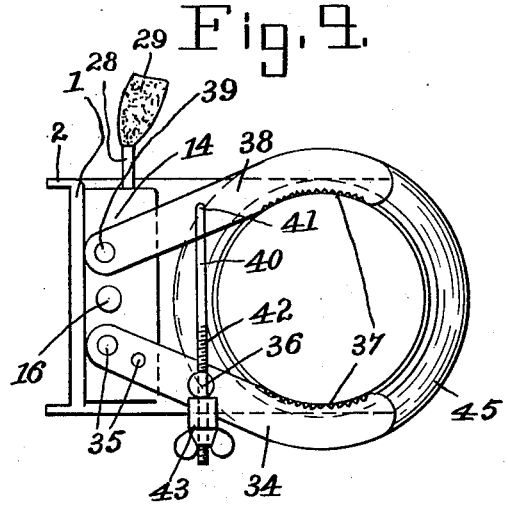
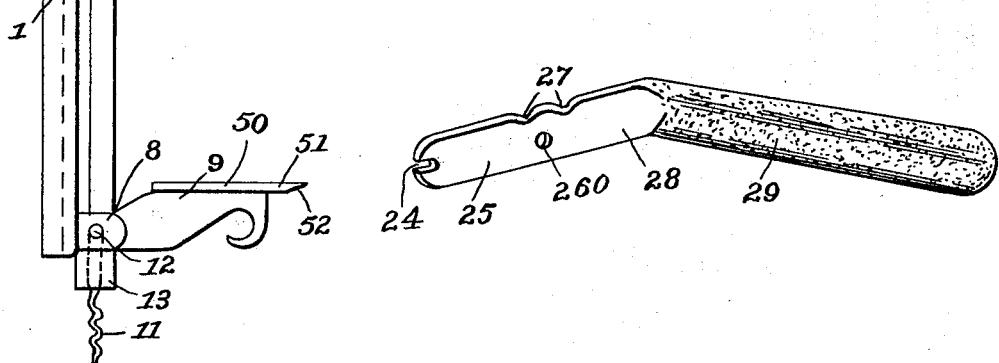
Inventor.
George D. Munsing
By Frederick V. Hunters
Attorney.

UNITED STATES PATENT OFFICE.

GEORGE D. MUNSING, OF NEW YORK, N. Y.

CAN-OPENER.

1,397,537.  Specification of Letters Patent.  Patented Nov. 22, 1921.

Application filed February 1, 1919, Serial No. 274,511. Renewed May 18, 1921. Serial No. 470,607.

*To all whom it may concern:*

Be it known that I, GEORGE D. MUNSING, a citizen of the United States, residing at New York, in the county of New York and State of New York, have invented certain new and useful Improvements in Can-Openers, of which the following is a full, clear, and exact specification.

This invention relates to a kitchen appliance or kit, and has for its object to provide a compact appliance of simple construction which can be attached to the wall or other convenient fixture in a kitchen and serve for a number of every day uses, such as cutting the heads of tin cans, removing the screw covers from fruit jars, taking off crimped bottle caps, and pulling out corks from bottles.

A special object is to so assemble the parts of the device that the operating parts of one appliance, such as the jar top remover, will not interfere with the other appliances, as the can opener, and both appliances may be used upon objects supported on the same shelf of the kit. The invention also contemplates the provision of a knife sharpener in connection with another part of the appliance, so that it will not take up any additional space or interfere with the other parts of the device.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Fig. 3 is a side elevation of the kit showing a fruit jar supported on the shelf with its cover or top gripped by the clamping jaws for holding the same while the jar is turned by hand for loosening said cover.

Fig. 4 is a top plan view of the device as shown in Fig. 3, and

Fig. 5 is a detailed view of the combined knife sharpener and cutter actuating lever.

Figure 1:
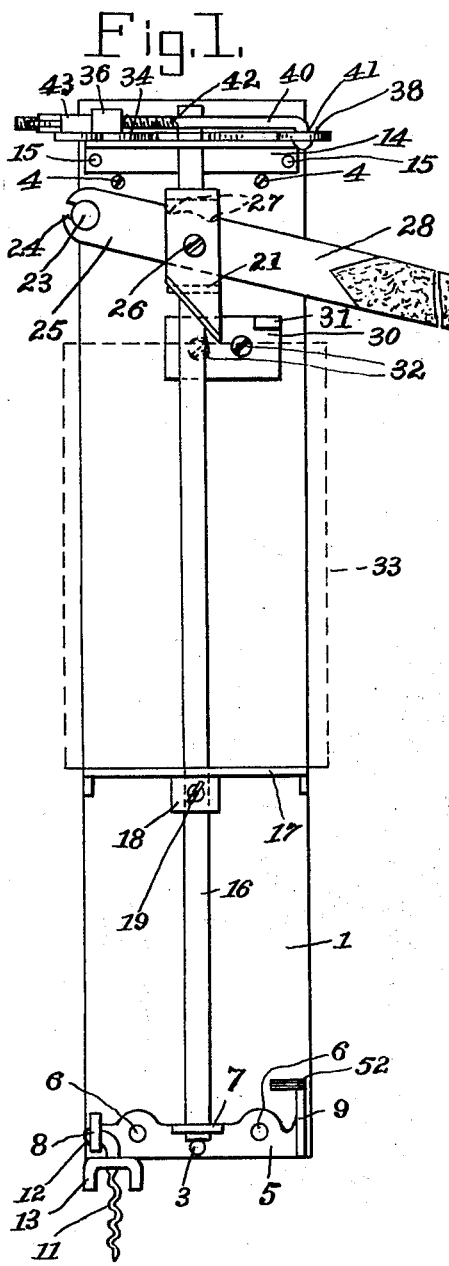
Figure 1 is a front elevation of the kit showing a can in dotted lines in position on the shelf for having its head cut out.

The several appliances are mounted on a wall plate 1 which may have turned lateral edges 2 to fit against a portion of the woodwork in a kitchen, although it should be understood that the wall plate may be secured any place desired. An opening 3 in the lower end portion of the plate, and two openings 4 in its upper end portion may be provided for the passage of fastening screws (not shown) to secure the plate to the desired fixture.

Across the bottom end portion of the plate there is fastened thereto, as by the rivets 6, a strip of metal 5 having one end portion bent to stand out away from the plate, as at 8. A corkscrew 11 is swiveled or hinged at 12 to this outstanding arm 8, and is adapted to be turned back against the plate when not in use, or turned to depending position, as illustrated, when it is to be used for removing the cork from a bottle. To do this, the bottle is pressed upward in the hands and rotated to drive the corkscrew into the cork, as will be readily understood, and after said cork screw is firmly embedded in the cork, the bottle is forced down and away from the appliance, whereupon the cork is withdrawn and left on the corkscrew. In this operation, a centering and stop member 13, which is mounted on the upper portion of the shank of the corkscrew, is of considerable assistance.

The other end portion 9 of the metal strip 5 is also bent out away from the plate and has a hook 10 formed on its lower edge to serve as a bottle cap remover. A bottle having the ordinary crimped cap may be held in the hand and the cap engaged with said hook 10, whereupon a twisting movement given to the bottle will remove the cap.

The strip 5 is further provided with a horizontal lug 7 arranged centrally between the edges of the plate, and in this lug is seated the lower end of a vertical rod 16 having its upper end connected to a bracket 14 fastened to the upper end portion of the plate by rivets 15, said rod being spaced from the plate and extending along the same parallel thereto. Mounted to slide along said rod is a shelf 17 which may be retained at any point of adjustment along the same by a set screw 19 working in a bracket 18 soldered or otherwise secured to the shelf, said set screw binding against the rod, as best shown in Figs. 2 and 3.

Mounted to slide on the upper portion of the rod is a double arm bracket 20 to which a cutter or knife 21 is fastened. The movement of said bracket and knife on the rod is limited by a lug 22 projecting from the face of the plate 1, as shown in Figs. 2 and 3. The cutter is actuated by a lever 25 pivotally connected intermediate its ends to the bracket 20 by a screw 26, and the end of said lever has a slot 24 to engage a pin 23 projecting from the plate and serving as a fulcrum for the lever. The free end or handle portion 28 of the lever is offset laterally, as illustrated in Fig. 5, so as to make it stand away from the wall, and said handle is coated with emery or other grinding material 29, making it useful for sharpening knives. The lever may be removed from the device by simply removing the screw 26 and sliding the shank of said lever out of the bracket 20 away from the pin 23. When connected to the cutter and bracket 20, the screw 26 engages an opening 260, Fig. 5, in the shank of the lever. The upper edge of said shank may be notched, as at 27, to clear the upper arm of the bracket when the lever is operated.

To the bracket 14 at the upper end of the plate 1, above the cutter 21, there is secured a pair of clamping jaws 34 and 38. The jaw 34 is fixed to the bracket by two rivets 35, while the jaw 38 is swiveled to the bracket by a single pivot lug 39. A connecting pin or bolt 40 is swiveled at 41 to the jaw 38 and is passed through a swiveled stud 36 on the jaw 34, and the free end portion of said bolt is screw-threaded, as at 42, to receive a thumb-nut 43 for adjusting the jaws and tightening them about the cover or top 44 of a fruit jar 45 when the latter is supported on the shelf 17 at the proper height, as shown in Figs. 3 and 4. The inner faces or edges of the jaws may be roughened or serrated, as at 37 to take a tight hold on the bottle top 44. When the top is thus clamped between the jaws 34 and 38, the body of the jar 45 may be grasped in both hands and turned to loosen said top in a very expeditions manner.

Figure 2:
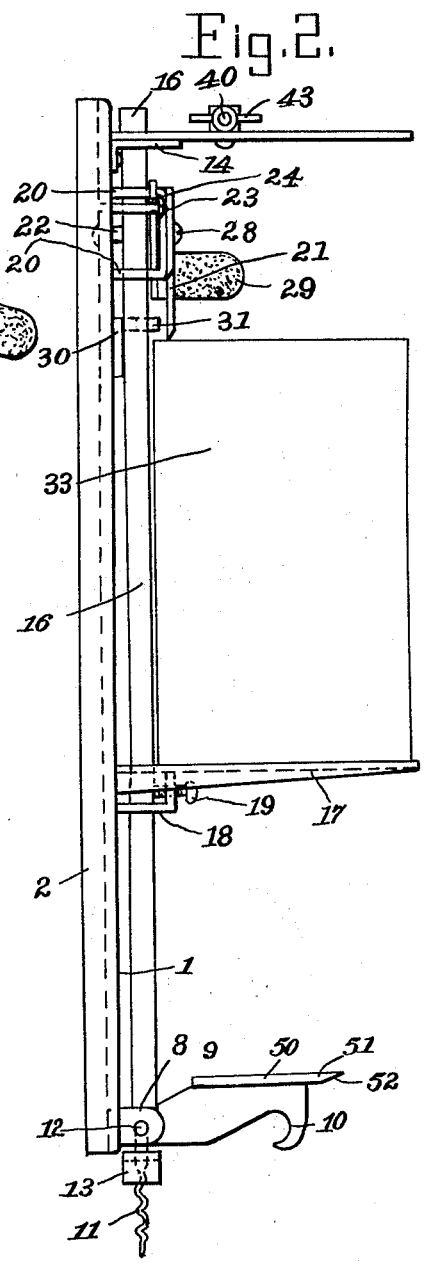
Fig. 2 is a side elevation of the kit, showing the can in solid lines.

When the device is to be used for opening a can, as shown in Figs. 1 and 2, the can 33 is placed on the shelf 17 which is adjusted to the proper height to bring the top of the can just below the cutter or knife 21. Downward pressure on the hand lever will then force the point of the knife down into the head of the can in an obvious manner. Any desired number of cuts or punches may be made in the top of the can by reciprocating the knife and turning the can on the shelf so as to bring a new place below said knife at each stroke.

The knife sharpener 29 on the handle of the lever 25 may be used while said lever is attached to the device, as illustrated in Fig. 1, or said lever may be removed as shown in Fig. 5 and the shank 28 grasped in one hand while the knife to be sharpened is held in the other hand, as is usual with a sharpening stone.

In addition to the stop lug 22 for the bracket 20 which carries the cutter 21, a stop 31 is also provided for the shank 28 of the lever 25. This stop 31 is carried by a bracket 30 which is fastened by screws or rivets 32 to the face of the plate 1, as shown in Fig. 1. Said stop 31 is also arranged so as to come in alinement with any undercut portions around the heads of various makes of cans which it may be desired to open by this device, and said stop further serves as a holding means to prevent an upward movement of the can when the cutter 21 is being withdrawn after cutting. It will also be noted that this stop 31 offers no obstacle to the opening of different sizes and shapes of cans for which the device is adapted.

The arm 9 of the strip 5, in addition to carrying the bottle cap removing hook 10, also has a horizontally turned flange 50 along its upper edge, said flange being extended beyond the hook, as at 51, and having its end tapered or sharpened, at 52, to provide means for prying off the removable tops of cans which are normally frictionally engaged with their can bodies and are well known though not illustrated herein. In operation, the sharpened end 52 of the flange 50 is introduced between the flange of the top and the upper surface of the can and by pressure on the can the said end 52 used to pry off the top or cover, as will be readily understood.

Having thus described my invention, what I claim as new and desire to secure by Letters Patent of the United States is:—

1. The combination with a supporting plate, of a vertical rod secured in spaced relation thereto, a shelf mounted to slide along said rod, means for securing the shelf to the rod at different adjustments, a cutter mounted to slide along the rod to operate on the head of a can when the latter is placed on the shelf, and a lever pivotally connected to the plate and cutter for actuating the latter.

2. The combination with a supporting plate, of a vertical rod secured in spaced relation thereto, a shelf mounted on said plate, a bracket having a vertical portion and spaced horizontal arms mounted to slide on said rod, a cutter secured to said bracket, and a lever pivoted to the plate and to the vertical portion of the bracket and extending between the arms of said bracket for actuating the cutter.

3. The combination with a supporting plate, of a vertical rod secured in spaced relation thereto, a shelf mounted on said plate, a bracket having a vertical portion and spaced horizontal arms mounted to slide on said rod, a cutter secured to said bracket, a lever pivoted to the plate and bracket for actuating the cutter, and a lug projecting from the plate between the arms of the bracket for limiting the movement of the cutter.

In testimony whereof I have signed my name to this specification.

GEORGE D. MUNSING.